2,886,576
// Patented May 12, 1959

2,886,576
3-(3-NITROANILINO)PHTHALIDE

Donald D. Wheeler and David C. Young, Midland, Mich., assignors to The Dow Chemical Company, Midland, Mich., a corporation of Delaware No Drawing. Application July 5, 1956
Serial No. 595,849

1 Claim. (Cl. 260—343.3)

This invention is concerned with nitroanilinophthalides having the formula

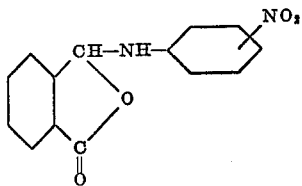

The new compounds of this invention are light-colored crystalline solids, somewhat soluble in organic solvents such as benzene, ethanol and acetone, and substantially insoluble in water. These compounds have insecticidal and antimicrobial activity. They are useful as toxicants in compositions to be employed for the control of fungi such as *Puccinia graminis tritici*.

The new compounds may be prepared by causing phthalaldehydic acid to react with nitroaniline to produce the desired phthalide and water of reaction. The terms "phthalaldehydic acid" and "3-hydroxyphthalide" refer to a compound having the formula

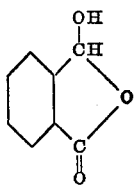

Phthalaldehydic acid is often represented in the literature as having the structure

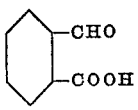

However, the acid employed in this invention and prepared as hereinafter described exists almost entirely in the 3-hydroxyphthalide ring structure, as indicated by its infrared absorption spectrum. Infrared data also indicate the phthalide products to have the same characteristic ring structure.

The reaction may be carried out conveniently in an inert solvent as reaction medium and takes place readily in the temperature range of from 20° to 150° C. with the formation of the desired phthalide products and water of reaction. Suitable solvents include acetone, benzene, butanone, water and alcohol. Good results are obtained when substantially equimolar proportions of the reactants are employed.

In carrying out the reaction phthalaldehydic acid and the appropriate nitroaniline are dissolved in or mixed with the reaction solvent. Mixing of the reactants oftentimes results in the development of heat of reaction. The reaction mixture is then heated for a period of from a few minutes to several hours to obtain the desired nitroanilinophthalide product. The latter usually precipitates from the reaction mixture during the heating as a crystalline solid. The mixture is then cooled to precipitate further product and the latter recovered from the mixture by filtration. The phthalide product may be purified, if desired, by washing with or recrystallizing from a suitable solvent.

The following examples illustrate the invention but are not to be construed as limiting.

*Example 1.—3-(4-nitroanilino)phthalide*

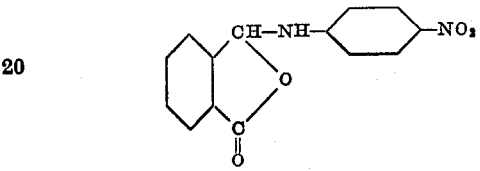

A solution of 69 grams (0.5 mole) of 4-nitroaniline in 150 milliliters of acetone and a solution of 75 grams (0.5 mole) of phthalaldehydic acid in 150 milliliters of acetone were mixed together and heated on the steam bath for a few minutes whereupon a solid product precipitated. The latter was separated from the reaction mixture by filtration and dried at about 60° C. to recover a 3-(4-nitroanilino)phthalide product melting at 246°–248° C. in a yield of 116.3 grams or 86.5 percent of the theoretical.

*Example 2.—3-(3-nitroanilino)phthalide*

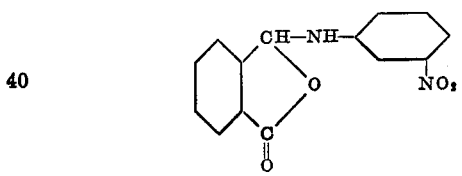

27.6 grams (0.2 mole) of 3-nitroaniline, 30.0 grams (0.2 mole) of phthalaldehydic acid and 100 milliliters of acetone were mixed together and the resulting mixture heated on the steam bath under reflux for about 0.5 hour. At first the mixture formed a homogeneous solution but as the heating was continued a solid product precipitated in the reaction mixture. The mixture was then cooled and the solid separated therefrom by filtration. The latter was washed with acetone and dried at about 60° C. to obtain a 3-(3-nitroanilino)phthalide product melting at 227°–229° C. The product amounted to a yield of 40 grams or 74 percent of theoretical.

*Example 3.—3-(2-nitroanilino)phthalide*

27.6 grams (0.2 mole) of 2-nitroaniline, 30.0 grams (0.2 mole) of phthalaldehydic acid and 100 milliliters of acetone are mixed together and the resulting mixture heated on the steam bath under reflux for about 0.5 hour. A reaction takes place with the formation of a solid product which precipitates in the reaction mixture. Thereafter the mixture is cooled to precipitate further product and then filtered to obtain a 3-(2-nitroanilino)-phthalide product having a molecular weight of 270.

The products of the present invention are useful as insecticides. In a representative operation, substantially complete mortality was observed with American cockroaches (*Periplaneta americana*) were contacted with an aqueous composition containing 0.24 gram of 3-(3-nitroanilino)phthalide in 100 milliliters of dispersion.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed in U.S. 2,748,162.

We claim:

3-(3-nitroanilino)phthalide.

References Cited in the file of this patent

Beilstein's Handbuch der Org. Chem., vol. 18, p. 606 (1934).